No. 652,858. Patented July 3, 1900.
H. NADORFF.
BUNG AND BUSHING THEREFOR.
(Application filed Nov. 27, 1899.)
(No Model.)
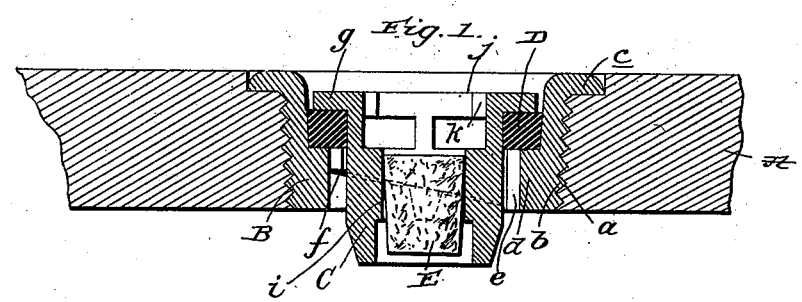
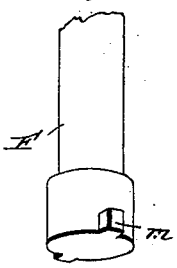
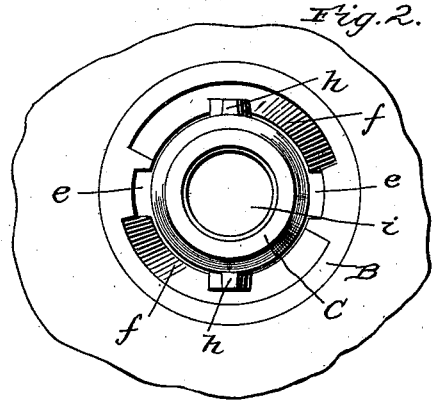
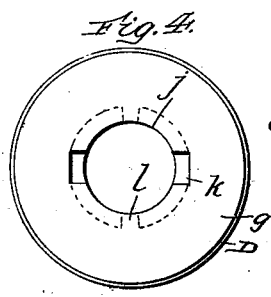
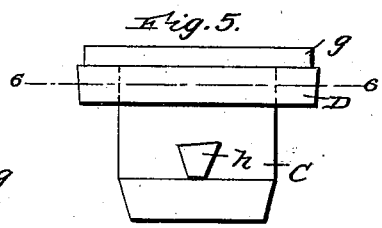
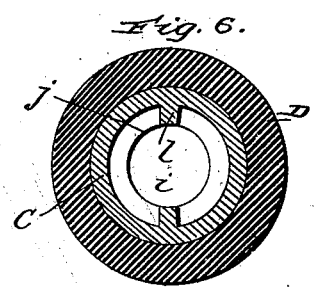
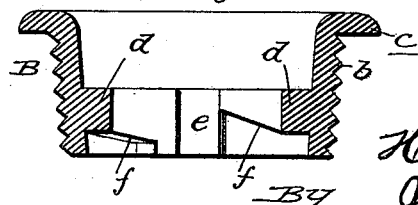
Witnesses:
E. H. Raeder
J. G. Croney
Inventor
Henry Nadorff
By James J. Shuhy
Attorney
THE NORRIS PETERS CO., PHOTO-LITHO., WASHINGTON, D. C.

UNITED STATES PATENT OFFICE.

HENRY NADORFF, OF LOUISVILLE, KENTUCKY.

BUNG AND BUSHING THEREFOR.

SPECIFICATION forming part of Letters Patent No. 652,858, dated July 3, 1900.

Application filed November 27, 1899. Serial No. 738,346. (No model.)

*To all whom it may concern:*

Be it known that I, HENRY NADORFF, a citizen of the United States, residing at Louisville, in the county of Jefferson and State of Kentucky, have invented new and useful Improvements in Bungs and Bushings Therefor, of which the following is a specification.

My invention relates to bungs and bushings therefor, and contemplates the provision of a bung and bushing designed more particularly for use in the side of a beer-barrel with a view of facilitating the connection of the air whistle or vent usually employed and permitting of the ready removal of the bung which is forced into the barrel when the same is tapped.

With the foregoing in mind the invention will be fully understood from the following description and claim when taken in conjunction with the accompanying drawings, in which—

Figure 1 is a sectional view illustrating my improved bung and bushing in their operative positions. Fig. 2 is an inverted plan view of the same. Fig. 3 is a diametrical section of the bushing. Fig. 4 is a plan view of the bung with the stopper removed. Fig. 5 is a side elevation of the same. Fig. 6 is a section taken in the plane indicated by the line 6 6 of Fig. 5. Fig. 7 is a perspective view of a portion of the key used in connecting the bung to and disconnecting it from the bushing.

Referring by letter to the said drawings, A is a wall of a barrel provided with the usual bung-hole $a$, and B is the bushing, which forms part of my improvements. This bushing is provided with exterior threads $b$ to fix it in the bung-hole $a$ and an exterior flange $c$ to limit its inward movement. It is also provided at about the distance shown from its inner end with an interior flange $d$. This flange has grooves $e$ at diametrically-opposite points in its edge and is also provided at its inner or under side with oppositely-disposed, inclined planes $f$, which extend in opposite directions from the grooves $e$, as shown.

C is my improved bung, which is flanged, as indicated by $g$, and carries a gasket D, designed to rest between the said flange $g$ and the flange $d$ of the bushing B, as shown in Fig. 1. The said bung is provided at opposite points with exterior lugs $h$, designed to pass through the grooves $e$ and engage the inclined planes $f$ of the bushing-flange $d$. It is also provided with a bore $i$, designed to receive a stopper E, of cork or other suitable material, and at its outer end has an inwardly-directed flange $j$. This flange $j$ is kerfed at opposite points, as indicated by $k$, and at its inner side stops $l$ are provided, the same being arranged midway between the kerfs or grooves $j$ and designed for a purpose presently pointed out.

F is a key which has lugs $m$ at opposite points and is designed to be used in connecting the bung to and disconnecting it from the bushing.

In practice when it is desired to fix the bung in the bushing the end of the key bearing the lugs $m$ is inserted in the bushing and said key is turned to carry the lugs into engagement with the stops $l$. The bung is then placed in the bushing so that its lugs $h$ pass through the grooves $e$ thereof and is turned so as to cause the lugs $h$ to engage the inclined planes $f$, and thereby draw the bung inwardly and compress the gasket D. The key is now removed, and after the barrel is filled with beer or other liquid the stopper E is forced to its position in the bung.

When it is desired to apply the ordinary air whistle or vent to the barrel, the stem of said whistle or vent is forced into the bore $i$ of the bung, thus displacing the stopper E and driving it into the barrel.

When the barrel is empty and it is desired to remove the stopper E as well as the bung forced into the barrel incident to the tapping thereof, the air whistle or vent before mentioned is removed from the bung and said bung is removed from the bushing through the medium of the key F. The removal of the bung obviously affords an opening of ample size to permit of the ready removal of the stopper and the tap-bung from the barrel.

Having thus described my invention, what I claim is—

The combination of a bushing adapted to be fixed in the wall of a barrel and having an interior flange, at a suitable distance from its outer end, provided in its edge with grooves, and at its inner side with oppositely-disposed, inclined planes extending in opposite directions from said grooves, the removable bung C arranged in the bushing and having the exterior flange at its outer end, and the exterior lugs $h$ at an intermediate point of its length, engaging the interior flange of the bushing, and also having the bore $i$ in its inner portion adapted to receive a stopper, and the inwardly-directed, kerfed flange $j$ at its outer end, and one or more stops $l$ at the inner side thereof; said flange $j$ and stops $l$ being designed for the engagement of a key having lugs, and a gasket surrounding the bung and interposed between the exterior flange thereof, and the flange at the inner end of the bushing, substantially as specified.

In testimony whereof I have hereunto set my hand in presence of two subscribing witnesses.

HENRY NADORFF.

Witnesses:
EDWARD BYRNE,
GEORGE SCHMIDT.